United States Patent
Hirata et al.

(10) Patent No.: US 6,372,679 B1
(45) Date of Patent: Apr. 16, 2002

(54) $CR_2O_3$-$AL_2O_3$ SINTERED BODY AND PROCESSES FOR PRODUCING SAME

(75) Inventors: Takehiko Hirata; Hirokazu Yamamoto, both of Yokohama (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 09/446,374

(22) PCT Filed: Dec. 22, 1998

(86) PCT No.: PCT/JP98/05800

§ 371 Date: Dec. 20, 1999

§ 102(e) Date: Dec. 20, 1999

(87) PCT Pub. No.: WO99/55637

PCT Pub. Date: Nov. 4, 1999

(30) Foreign Application Priority Data

Apr. 28, 1998 (JP) ............................................. 10-132572

(51) Int. Cl.[7] ............................................... C04B 35/10
(52) U.S. Cl. ........................ 501/132; 501/134; 264/674
(58) Field of Search ............................. 501/132, 134; 264/674

(56) References Cited

U.S. PATENT DOCUMENTS 4,544,643 A 10/1985 Fraser .......................... 501/127
4,823,359 A * 4/1989 Ault et al. ..................... 373/137

FOREIGN PATENT DOCUMENTS

| JP | 54-43909 | 4/1979 | C04B/35/10 |
| JP | 61-10055 | 1/1986 | C04B/35/12 |
| JP | 03208863 A | 9/1991 | C04B/35/10 |
| JP | 03287686 | * 12/1991 | |
| JP | 04132656 A | 5/1992 | C04B/35/10 |
| JP | 05270896 A | 10/1993 | C04B/35/10 |

* cited by examiner

*Primary Examiner*—Paul Marcantoni
(74) *Attorney, Agent, or Firm*—Myers Bigel Sibley & Sajovec, P.A.

(57) ABSTRACT

This invention relates to processes for the production of a sintered body consisting of an intimate solid solution of $Cr_2O_3$ and $Al_2O_3$ by using inexpensive materials, as well as sintered bodies produced thereby. More specifically, it relates to processes for the production of a sintered body which comprises the steps of providing a powder mixture consisting essentially of $Cr_2O_3$ powder and $Al_2O_3$ powder each having an average particle diameter of not greater than 0.5 μm, or a powder mixture obtained by mixing the aforesaid powder mixture with 1.5 to 15% by weight of $TiO_2$ powder having an average particle diameter of not greater than 0.5 μm, and sintering the powder mixture at a temperature of 1,350 to 1,600° C. in a vacuum atmosphere of $10^{-20}$ to $10^{-5}$ atm. to yield a sintered body consisting of an intimate solid solution of $Cr_2O_3$ and $Al_2O_3$ and having a relative density of not less than 95%, as well as sintered bodies produced thereby.

5 Claims, 6 Drawing Sheets

CR₂O₃-AL₂O₃ SINTERED BODY AND PROCESSES FOR PRODUCING SAME

TECHNICAL FIELD

This invention relates to $Cr_2O_3$—$Al_2O_3$ ceramics which can be expected to be applicable to high-temperature components subject to severe corrosion by molten salts, such as coatings for the rotor blades of low-quality oil-fired gas turbines, burner nozzles and diffuser cones of crude fuel-fired boilers, and stokers of refuse incinerators, and to processes for producing the same.

BACKGROUND ART

The resistance of $Cr_2O_3$—$Al_2O_3$ ceramics to corrosion by molten salts comprising heavy metal oxides and alkali salts depends primarily on the sintering temperature and the content of $Cr_2O_3$—$Al_2O_3$ solid solution. In order to achieve high corrosion resistance, it is necessary to form a dense sintered body consisting of a complete solid solution of $Cr_2O_3$ and $Al_2O_3$. However, since $Cr_2O_3$ has poor sinterability, a hot isostatic pressing machine or the like must be used to yield a dense sintered body.

Consequently, conventional processes have the disadvantage that they require a considerable cost and have a limited throughput owing to the use of a hot isostatic pressing machine or the like. Moreover, the conventional processes also have the disadvantage that the formation of a $Cr_2O_3$—$Al_2O_3$ solid solution does not proceed to the fullest extent, causing $Cr_2O_3$ and $Al_2O_3$ particles to remain in the sintered body.

DISCLOSURE OF THE INVENTION

The present inventors made intensive investigations on processes in which $TiO_2$ serving as an assistant for accelerating the diffusion of $Al_2O_3$ and $Cr_2O_3$ is added in order to improve the sintered density and promote the formation of a $Cr_2O_3$—$Al_2O_3$ solid solution, and in which finely powdered raw materials are sintered under conditions including a suitable atmosphere and a suitable temperature. As a result, it has been found that, by adding $TiO_2$, using finely powdered raw materials, and employing a suitable sintering atmosphere and a suitable sintering temperature, an improvement in sinterability can be achieved to yield a sintered body showing an improvement in compositional homogeneity and resistance to corrosion by molten salts. The constitution of the present invention is as follows.

Embodiment 1

A process for the production of a sintered body having excellent resistance to corrosion by molten salts which comprises the steps of providing a powder mixture A consisting essentially of $Cr_2O_3$ powder having an average particle diameter of not greater than 0.5 µm and $Al_2O_3$ powder having an average particle diameter of not greater than 0.5 µm, mixing the powder mixture A with $TiO_2$ powder having an average particle diameter of not greater than 0.5 µm to form a powder mixture B containing the $TiO_2$ powder in an amount of 1.5 to 15% by weight based on the combined amount of the powder mixture A and the $TiO_2$ powder, and sintering the powder mixture B at a temperature of 1,350 to 1,600° C. in a vacuum atmosphere of $10^{-20}$ to $10^{-5}$ atm. to yield a sintered body consisting of an intimate solid solution of $Cr_2O_3$ and $Al_2O_3$ and having a relative density of not less than 95%.

Embodiment 2

A process for the production of a sintered body having excellent resistance to corrosion by molten salts which comprises the steps of providing a powder mixture A consisting essentially of $Cr_2O_3$ powder having an average particle diameter of not greater than 0.5 µm and $Al_2O_3$ powder having an average particle diameter of not greater than 0.5 µm, and sintering the powder mixture A at a temperature of 1,350 to 1,600° C. in a vacuum atmosphere of $10^{-20}$ to $10^{-5}$ atm. to yield a sintered body consisting of an intimate solid solution of $Cr_2O_3$ and $Al_2O_3$ and having a relative density of not less than 95%.

Embodiment 3

A process for the production of a sintered body as described above in embodiment 2 wherein the sintering temperature is in the range of 1,450 to 1,600° C.

Embodiment 4

A process for the production of a sintered body as described above in any of embodiments 1 to 3 wherein the $Cr_2O_3$ powder is used in an amount of 40 to 60% by weight based on the powder mixture of $Cr_2O_3$ powder and $Al_2O_3$ powder.

Embodiment 5

A sintered body having excellent resistance to corrosion by molten salts which is a sintered body consisting essentially of a solid solution phase composed of $Cr_2O_3$ and $Al_2O_3$ and having a relative density of not less than 95% and which contains no phase composed of $Al_2O_3$ alone.

The above-described processes for the production of a sintered body in accordance with the present invention make it possible to produce a dense sintered body consisting of a homogeneous solid solution of $Cr_2O_3$ and $Al_2O_3$ and thereby achieve a concomitant improvement in corrosion resistance.

BEST MODE FOR CARRYING OUT THE INVENTION

Figure 1:
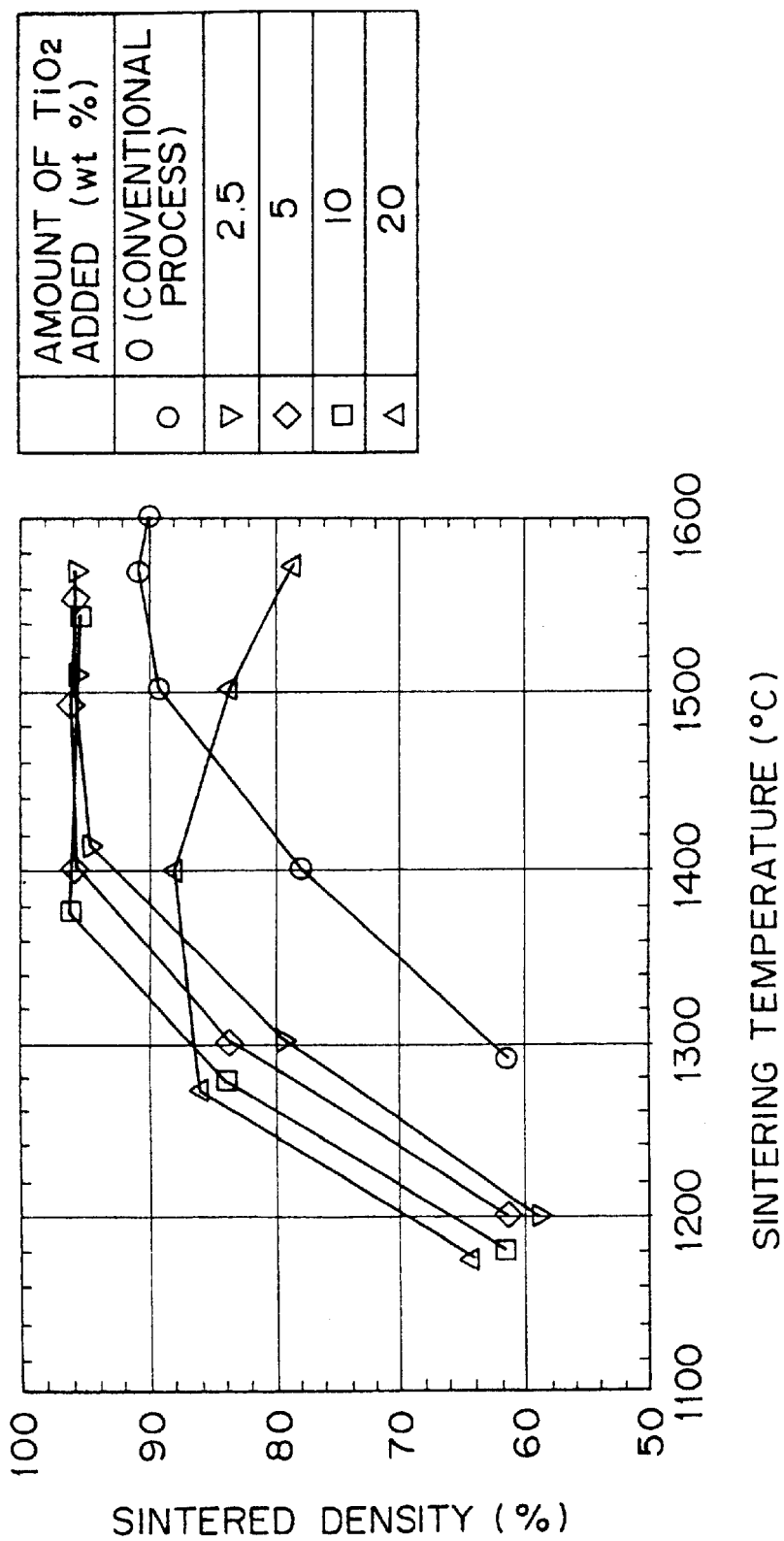
FIG. 1 is a graph showing the dependence of sintered density on sintering temperature for $Cr_2O_3$—$Al_2O_3$ sintered bodies made by adding $TiO_2$ according to one process of the present invention and a $Cr_2O_3$—$Al_2O_3$ sintered body made according to a conventional process.

The present invention relates to sintered bodies having excellent resistance to corrosion by molten salts in which its sintered density is increased to 95% or greater and the formation of a $Cr_2O_3$—$Al_2O_3$ solid solution is promoted so as to form a single phase. The processes for producing such sintered bodies include a process in which a mixture of $Cr_2O_3$ powder and $Al_2O_3$ powder each having a reduced average particle diameter is sintered in a vacuum atmosphere, a process in which a predetermined amount of $TiO_2$ powder is added to the aforesaid powder mixture and the resulting mixture is sintered in a vacuum atmosphere, and a combination of both processes. These processes are more specifically explained below.

In the process using a powder mixture having a reduced average particle diameter, $Cr_2O_3$ powder and $Al_2O_3$ powder each having an average particle diameter of not greater than 0.5 μm are intimately mixed in an organic solvent such as an alcohol (e.g., butanol), acetone, xylene or toluene, and the resulting mixture is sintered in a vacuum atmosphere. The reduced particle diameter of the powder mixture can mitigate the requirements for the diffusion of atoms and thereby promote the formation of a homogeneous solid solution. If the $Cr_2O_3$ powder has a particle diameter of not greater than 0.2 μm and the $Al_2O_3$ powder has a particle diameter of not greater than 0.25 μm, a more complete solid solution will be formed easily.

As to the sintering atmosphere, ceramics are generally sintered under atmospheric conditions. However, a vacuum atmosphere must be employed in the present invention.

The reason for this is that, since the oxidation of $Cr_2O_3$ is promoted under atmospheric conditions and the resulting $CrO_3$ vaporizes and condenses with other particles in the sintered body, small particles are coarsened to cause a reduction in the density of the sintered body. Accordingly, in order to prevent the oxidation of Cr ion and thereby maintain the density of the sintered body at a high level, a vacuum atmosphere, especially of not greater than $10^{-5}$ atm., is used in the present invention. However, since an unduly high degree of vacuum, especially of less than $10^{-20}$ atm., may cause Cr ion to be reduced to metallic chromium, it is desirable to use a degree of vacuum in the range of $10^{-5}$ to $10^{-20}$ atm.

On the other hand, the process involving the addition of a predetermined amount of $TiO_2$ is based on the principle that the sintered density is raised by utilizing the interaction of $TiO_2$ with $Cr_2O_3$ and $Al_2O_3$. $TiO_2$ tends to form vacancies for Al and Cr cations under electroneutral conditions. Since the diffusion of atoms proceeds by utilization of these vacancies, $Cr_2O_3$ and $Al_2O_3$ become readily soluble in each other and can be easily sintered together. To this end, it is desirable to add $TiO_2$ powder in an amount of not less than 1.5% by weight. However, since the addition of an unduly large amount of $TiO_2$ causes the precipitation of a third phase and, on the contrary, provides starting points of corrosion, it is highly desirable to limit the amount of $TiO_2$ to less than 15% by weight and preferably 4% or less.

In order to increase the diffusion rate of atoms and thereby facilitate sintering, the sintering temperature should be not lower than 1,350° C. However, unduly high temperatures exceeding 1,600° C., on the contrary, tend to cause a reduction in sintered density. Accordingly, it is desirable that the sintering temperature is in the range of 1,350 to 1,600° C. When no $TiO_2$ powder is added, the number of vacancies for promoting the diffusion of atoms is relatively small. Consequently, it is desirable to employ a somewhat higher sintering temperature in the range of 1,450 to 1,600° C.

The relative density is associated with defects (i.e., cracks) present in the sintered body. At a relative density of less than 95%, through cracks tend to occur frequently, so that corrosive molten salts penetrate deep into these cracks and thereby accelerate corrosion. On the other hand, the occurrence of such cracks is rare at a relative density of 95% or greater, resulting in an improvement in the resistance of the sintered body to corrosion by molten salts. Accordingly, it is desirable that the sintered body has a relative density of not less than 95%.

The contents of $Cr_2O_3$ powder and $Al_2O_3$ powder may be in any desired range, so long as they can be homogeneously mixed. However, if there is a large difference in content, one tends to segregate in the other, thus making it difficult to form a solid solution. Accordingly, it is preferable that the content of $Cr_2O_3$ powder is in the range of 40 to 60% by weight based on the combined weight of $Cr_2O_3$ powder and $Al_2O_3$ powder.

EXAMPLES

In order to demonstrate the effects of the present invention more clearly, the following specific examples are given.

Example 1

In this Example 1, there were used $Cr_2O_3$ powder having an average particle diameter of 0.2 μm, $Al_2O_3$ powder having an average particle diameter of 0.25 μm, and $TiO_2$ powder having an average particle diameter of 0.2 or 1.0 μm. Moreover, as a comparative example, a comparison with the present invention was made by carrying out a conventional process using $Cr_2O_3$ powder having an average particle diameter of 1.0 μm and $Al_2O_3$ powder having an average particle diameter of 1.0 μm.

$Cr_2O_3$ powder and $Al_2O_3$ powder were weighed and mixed so as to give a powder mixture comprising 50 wt. % each of $Cr_2O_3$ and $Al_2O_3$. Then, 2.5, 5, or 10 wt. % of $TiO_2$ powder was added to the above powder mixture, and mixed therewith in an organic solvent (i.e., butyl alcohol) for 120 hours by means of a mixing machine. The resulting mixture was dried at 80° C. with a vacuum dryer. This powder mixture was uniaxially pressed at a pressure of 100 kgf/cm² and then formed into a compact by cold isostatic pressing at a pressure of 1,000 kgf/cm². In an atmosphere having an oxygen partial pressure of $10^{-8}$ atm., this compact was sintered at 1,200–1,600° C. for 3 hours. On the other hand, in the conventional process carried out as a comparative example, $Cr_2O_3$ powder and $Al_2O_3$ powder were weighed so as to give a powder mixture comprising 50 wt. % each of $Cr_2O_3$ and $Al_2O_3$, and mixed in butyl alcohol for 120 hours by means of a mixing machine. The resulting mixture was dried at 80° C. with a vacuum dryer, pressed in the same manner as described above, and then sintered for 3 hours in a vacuum having an oxygen partial pressure of $10^{-8}$ atm.

With respect to the $Cr_2O_3$—$Al_2O_3$ sintered bodies made according to the process of the present invention and the conventional process (comparative example), the dependence of sintered density on sintering temperature is shown in FIG. 1. As shown in FIG. 1, the conventional process failed to give a relative density of 95% or greater at any sintering temperature. In contrast, when the process of the present invention was carried out under such conditions that 2.5 to 10 wt. % of $TiO_2$ powder having an average particle diameter of 0.2 µm was added, a sintered density of 95% or greater was achieved at a sintering temperature of 1,400° C. However, under such conditions that 20 wt. % of $TiO_2$ powder having an average particle diameter of 0.2 µm was added, the sintered density did not reach 95% or greater.

Figure 2:
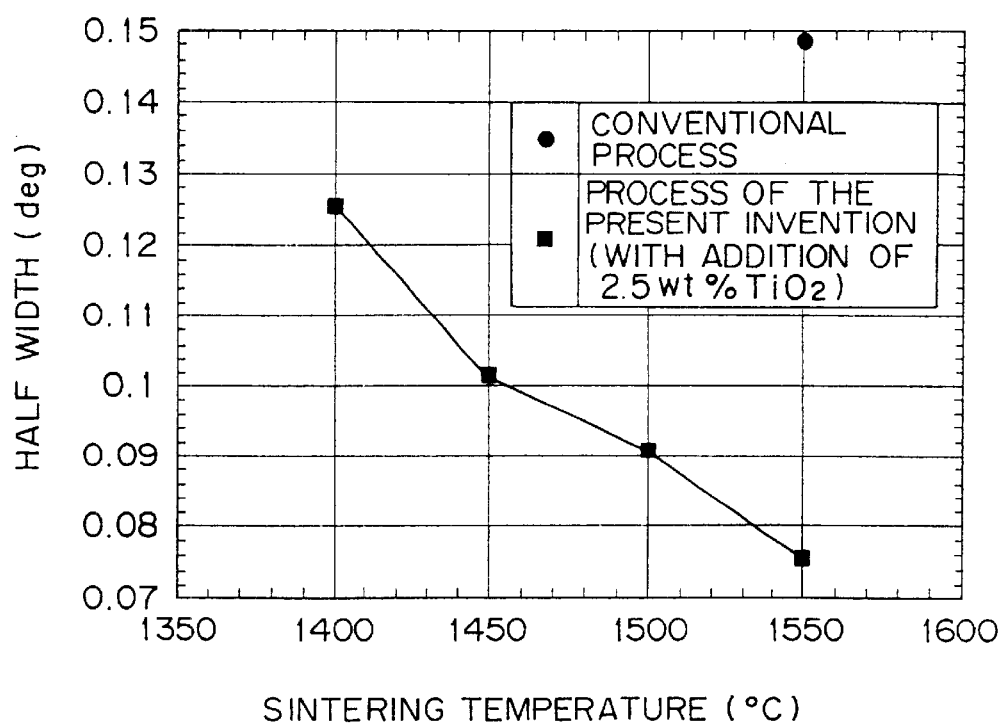
FIG. 2 is a graph showing the dependence of the half depth of the X-ray diffraction peak recorded with the (1,0,10) plane on sintering temperature for $Cr_2O_3$—$Al_2O_3$ sintered bodies made by adding $TiO_2$ according to one process of the present invention and a $Cr_2O_3$—$Al_2O_3$ sintered body made according to a conventional process.

Moreover, with respect to 50 wt. % $Cr_2O_3$—$Al_2O_3$ sintered bodies made by adding 2.5 wt. % of $TiO_2$ powder according to the process of the present invention, and a 50 wt. % $Cr_2O_3$—$Al_2O_3$ sintered body made according to the conventional process, the dependence of the half width of the X-ray diffraction peak recorded with the (1,0,10) plane of the $Cr_2O_3$—$Al_2O_3$ solid solution on sintering temperature is shown in FIG. 2. As shown in FIG. 2, when the process of the present invention was carried out under such conditions that 2.5 wt. % of $TiO_2$ powder was added, the peak of the resulting $Cr_2O_3$—$Al_2O_3$ solid solution was sharpened as compared with the sintered body made according to the conventional process, indicating that a more homogeneous composition was obtained.

Figure 3:
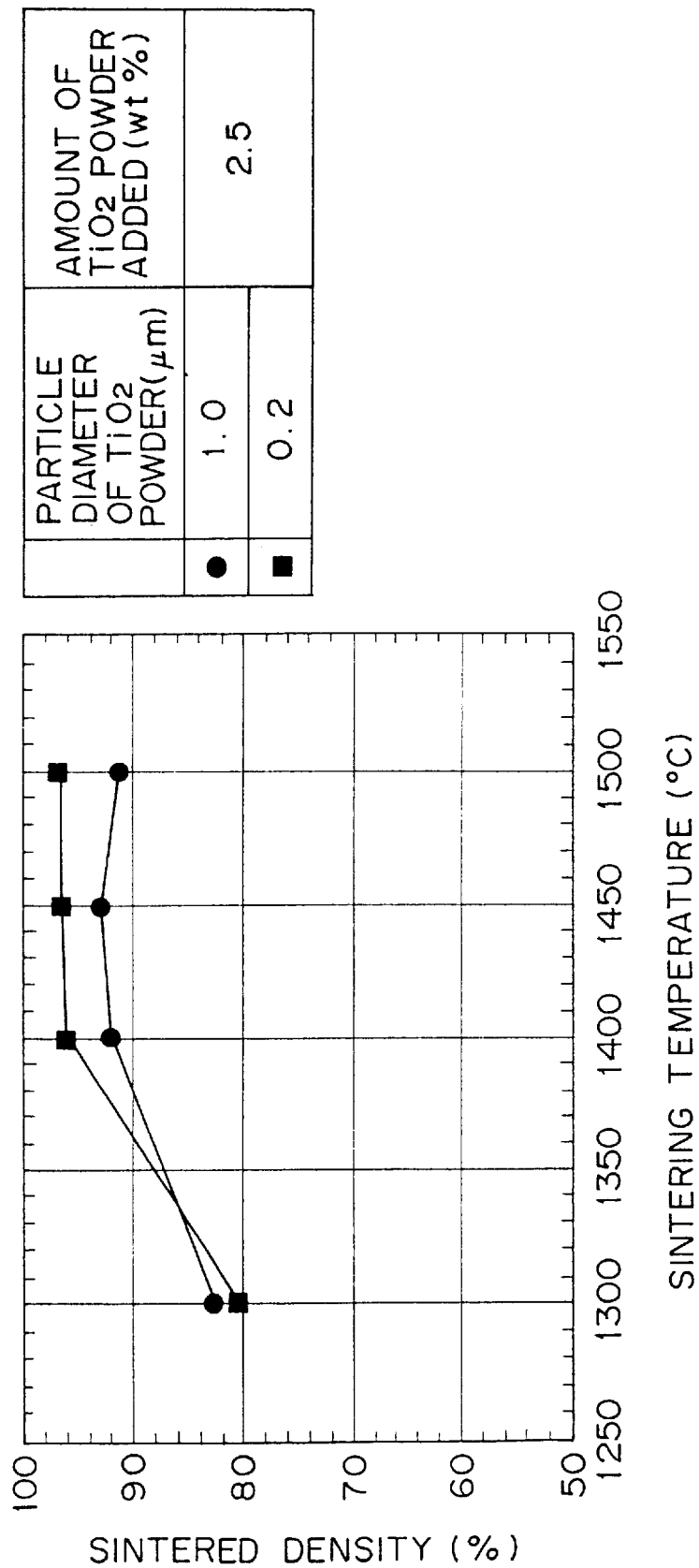
FIG. 3 is a graph showing the dependence of sintered density on the particle diameter of $TiO_2$ powder for $Cr_2O_3$—$Al_2O_3$ sintered bodies made by adding $TiO_2$ according to one process of the present invention.

With respect to $Cr_2O_3$—$Al_2O_3$ sintered bodies having $TiO_2$ powder added thereto, the dependence of sintered density on the particle diameter of $TiO_2$ powder is shown in FIG. 3. As shown in FIG. 3, when the sintering temperature was 1,450° C., $TiO_2$ powder having a particle diameter of 1 µm gave a sintered density of 94%, but $TiO_2$ powder having a particle diameter of 0.2 µm gave a sintered density of 98%. Thus, a higher sintered density is obtained by using $TiO_2$ powder having a particle diameter of 0.2 µm. It is believed that, since the sintered density depends on the dispersed state of $TiO_2$, finer $TiO_2$ powder is more uniformly dispersed and hence causes an enhancement in sintered density. Accordingly, the average particle diameter of $TiO_2$ powder has been determined to be not greater than 0.5 µm as described above.

Figure 4:
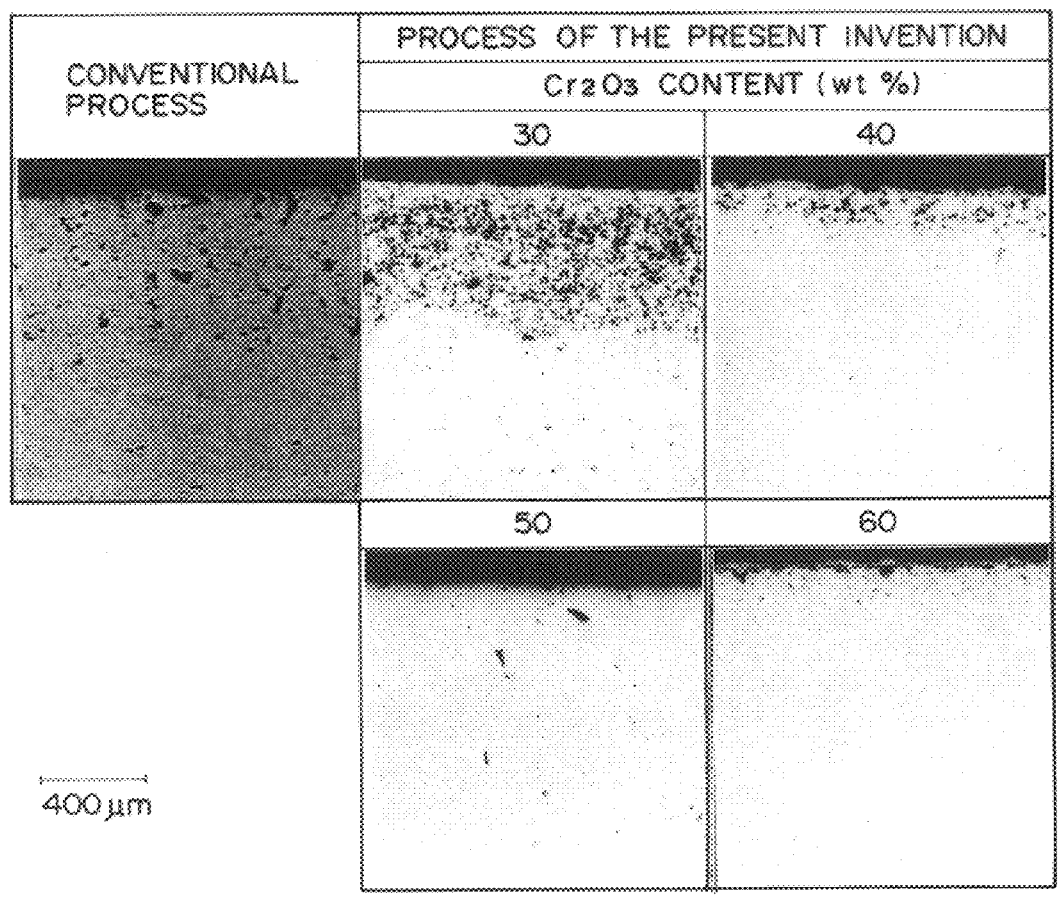
FIG. 4 includes photographs showing the corrosion characteristics of $Cr_2O_3$—$Al_2O_3$ sintered bodies made by adding $TiO_2$ according to one process of the present invention and a $Cr_2O_3$—$Al_2O_3$ sintered body made according to a conventional process.

Furthermore, with respect to $Cr_2O_3$—$Al_2O_3$ sintered bodies made by adding $TiO_2$ powder having an average particle diameter of 0.2 µm according to the process of the present invention, the depth of erosion caused by soaking them in a molten 60 wt. % $V_2O_5$–40 wt. % $Na_2SO_4$ salt at 900° C. for 100 hours is shown in FIG. 4. At the same time, with respect to a 50 wt. % $Cr_2O_3$—$Al_2O_3$ sintered body made according to the conventional process, the depth of erosion caused by soaking it in a molten 60 wt. % $V_2O_5$–40 wt. % $Na_2SO_4$ salt at 900° C. for 100 hours is also shown in FIG. 4 as a comparative example. For the sintered bodies made according to the process of the present invention, those having a $Cr_2O_3$ content of 40–60 wt. % showed a depth of erosion of not greater than 100 µm and hence had higher corrosion resistance as compared with the sintered body made according to the conventional process and showing a depth of erosion of 400 µm. Thus, when sintered bodies are made according to the process of the present invention, they have a higher sintered density and a more homogeneous composition, and hence show an improvement in resistance to corrosion by molten salts.

Example 2

In this Example 2, there were used $Cr_2O_3$ powder having an average particle diameter of 0.2 µm and $Al_2O_3$ powder having an average particle diameter of 0.25 µm. Moreover, a comparison with the present invention was made by carrying out a conventional process using $Cr_2O_3$ powder having an average particle diameter of 1 µm and $Al_2O_3$ powder having an average particle diameter of 1 µm.

$Cr_2O_3$ powder and $Al_2O_3$ powder were weighed so as to give a powder mixture comprising 50 wt. % each of $Cr_2O_3$ and $Al_2O_3$, and mixed in butyl alcohol for 120 hours by means of a mixing machine. The resulting mixture was dried at 80° C. with a vacuum dryer. This powder mixture was uniaxially pressed at a pressure of 100 kgf/cm² and then form into a compact by cold isostatic pressing at a pressure of 1,000 kgf/cm². In an atmosphere having an oxygen partial pressure of $10^{-5}$ atm., this compact was sintered at 1,300–1,600° C. for 3 hours. On the other hand, in the conventional process carried out as a comparative example, $Cr_2O_3$ powder and $Al_2O_3$ powder were weighed so as to give a powder mixture comprising 50 wt. % each of $Cr_2O_3$ and $Al_2O_3$, and mixed in an organic solvent for 120 hours by means of a mixing machine. The resulting mixture was dried at 80° C. with a vacuum dryer, pressed in the same manner as described above, and then sintered for 3 hours in a vacuum having an oxygen partial pressure of $10^{-15}$ atm.

Figure 5:
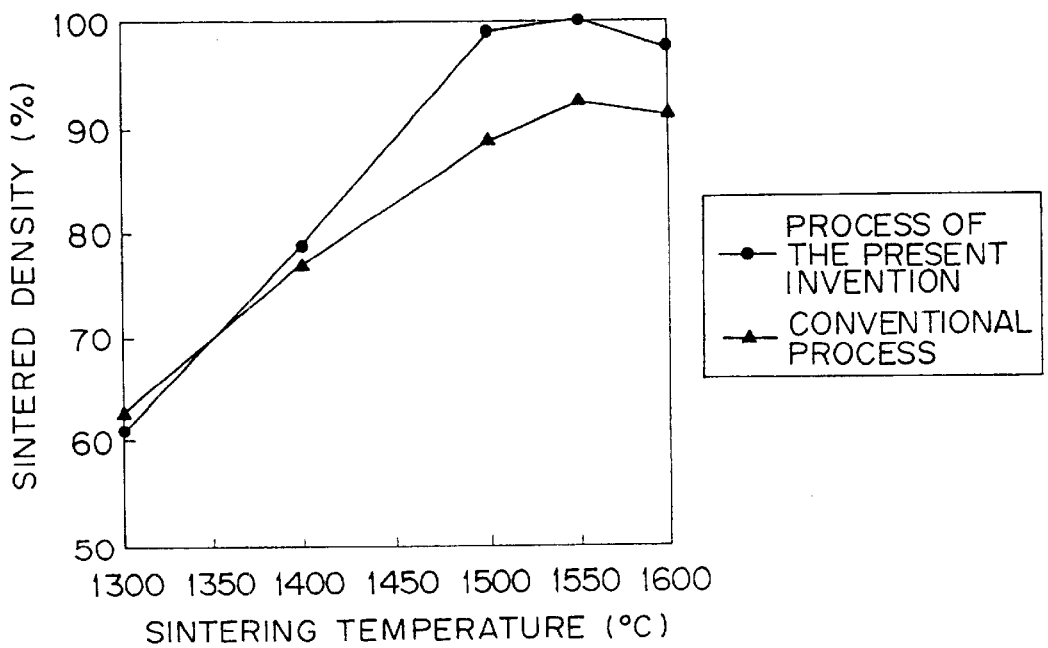
FIG. 5 is a graph showing the dependence of sintered density on sintering temperature for $Cr_2O_3$—$Al_2O_3$ sintered bodies made according to another process of the present invention and a conventional process.
Figure 6:
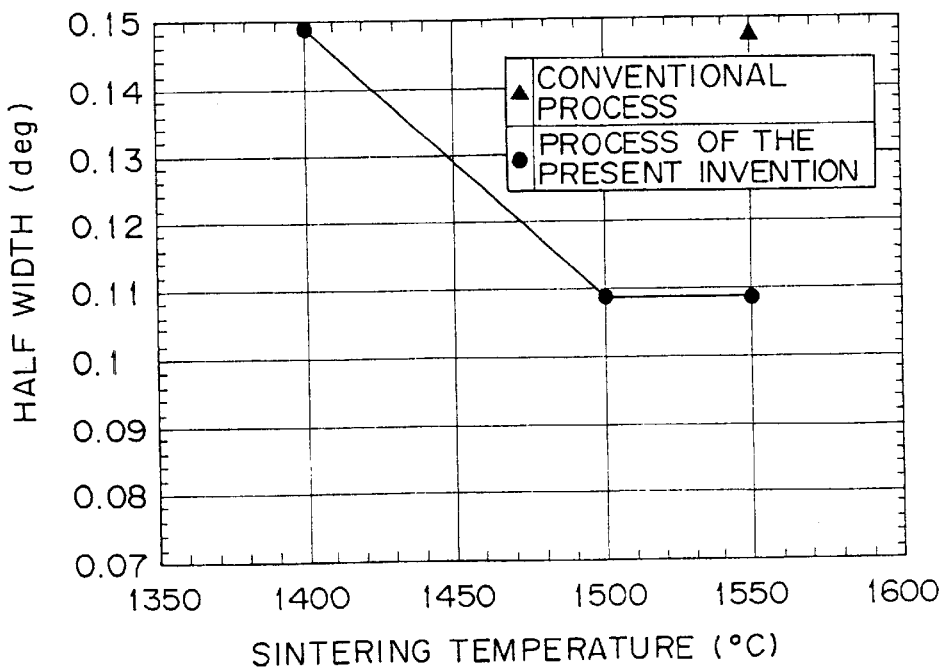
FIG. 6 is a graph showing the dependence of the half depth of the X-ray diffraction peak recorded with the (1,0,10) plane on sintering temperature for $Cr_2O_3$—$Al_2O_3$ sintered bodies made according to another process of the present invention and a conventional process.

With respect to the $Cr_2O_3$—$Al_2O_3$ sintered bodies made according to the process of the present invention and the conventional process, the dependence of sintered density on sintering temperature is shown in FIG. 5. As shown in FIG. 5, the conventional process failed to give a relative density of 95% or greater at any sintering temperature. In contrast, the process of the present invention yielded a sintered body having a sintered density of 98% or greater at a sintering temperature of 1,500° C. Moreover, with respect to the $Cr_2O_3$—$Al_2O_3$ sintered bodies made according to the process of the present invention and the conventional process, the dependence of the results of X-ray diffraction analysis on sintering temperature is shown in FIG. 6. As can be seen from this figure, when the process of the present invention was employed, the peak of the resulting $Cr_2O_3$—$Al_2O_3$ solid solution was sharpened as compared with the sintered body made according to the conventional process, indicating that a more homogeneous composition was obtained.

Figure 7:
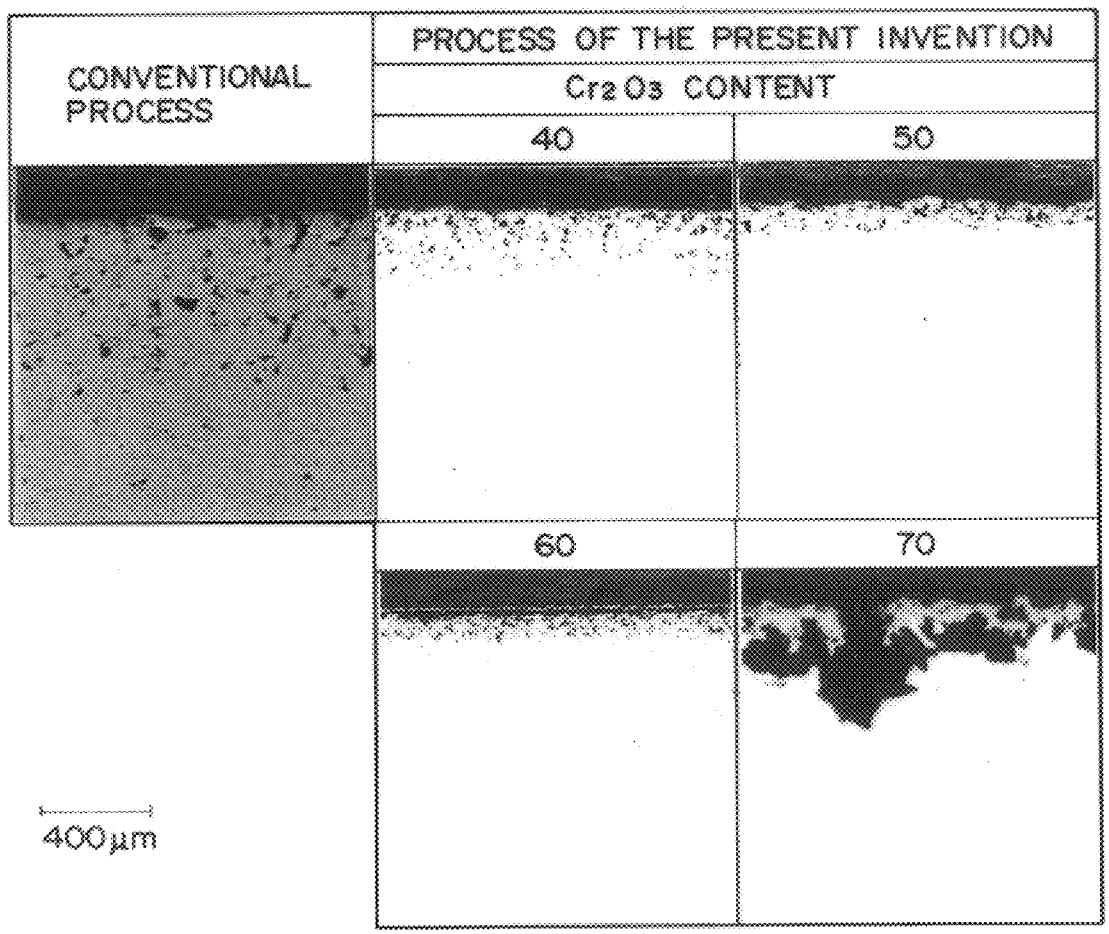
FIG. 7 includes photographs showing the corrosion characteristics of $Cr_2O_3$—$Al_2O_3$ sintered bodies made according to another process of the present invention and a conventional process.

Moreover, with respect to sintered bodies made according to the process of the present invention and hence having a sintered density of 95% or greater and a homogeneous composition, and a sintered body made according to the conventional process, the depth of erosion caused by soaking them in a molten 60 wt. % $V_2O_5$–40 wt. % $Na_2SO_4$ salt at 900° C. for 100 hours is shown in FIG. 7. For the sintered bodies made according to the process of the present invention, those having a $Cr_2O_3$ content of 40–60 wt. % showed a depth of erosion of 150 µm as contrasted with the sintered body made according to the conventional process and showing a depth of erosion of 400 µm. Thus, when sintered bodies are made according to the process of the present invention, they have a higher sintered density and a more homogeneous composition, and hence show an improvement in resistance to corrosion by molten salts.

Exploitability in Industry

As described above, the present invention may be applied to high-temperature components subject to severe corrosion by molten salts, such as coatings for the rotor blades of low-quality oil-fired gas turbines, burner nozzles and diffuser cones of crude fuel-fired boilers, and stokers of refuse incinerators.

What is claimed is:

1. A process for the production of a sintered body having excellent resistance to corrosion by molten salts which comprises the steps of providing a powder mixture A consisting essentially of $Cr_2O_3$ powder having an average particle diameter of not greater than 0.5 µm and $Al_2O_3$ powder having an average particle diameter of not greater than 0.5 μm, mixing said powder mixture A with $TiO_2$ powder having an average particle diameter of not greater than 0.5 μm to form a powder mixture B containing the $TiO_2$ powder in an amount of 1.5 to 15% by weight based on the combined amount of said powder mixture A and the $TiO_2$ powder, and sintering said powder mixture B at a temperature of 1,350 to 1,600° C. in a vacuum atmosphere of $10^{-20}$ to $10^{-5}$ atm. to yield a sintered body consisting of an intimate solid solution of $Cr_2O_3$ and $Al_2O_3$ and having a relative density of not less than 95%.

2. A process for the production of a sintered body having excellent resistance to corrosion by molten salts which comprises the steps of providing a powder mixture A consisting essentially of $Cr_2O_3$ powder having an average particle diameter of not greater than 0.5 μm and $Al_2O_3$ powder having an average particle diameter of not greater than 0.5 μm, and sintering said powder mixture A at a temperature of 1,350 to 1,600° C. in a vacuum atmosphere of $10^{-20}$ to $10^{-5}$ atm. to yield a sintered body consisting of an intimate solid solution of $Cr_2O_3$ and $Al_2O_3$ and having a relative density of not less than 95%.

3. A process for the production of a sintered body as claimed in claim 2 wherein the sintering temperature is in the range of 1,450 to 1,600° C.

4. A process for the production of a sintered body as claimed in any of claims 1 to 3 wherein the $Cr_2O_3$ powder is used in an amount of 40 to 60% by weight based on the powder mixture of $Cr_2O_3$ powder and $Al_2O_3$ powder.

5. A sintered body having excellent resistance to corrosion by molten salts which is a sintered body consisting essentially of a solid solution composed of $Cr_2O_3$ and $Al_2O_3$ and having a relative density of not less than 95% and a $Cr_2O_3$ and $Al_2O_3$ solid solution present as a single phase.

* * * * *